(12) United States Patent
Youm

(10) Patent No.: US 7,170,246 B2
(45) Date of Patent: Jan. 30, 2007

(54) MOTOR CONTROL APPARATUS

(75) Inventor: Jang-Hyoun Youm, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 74 days.

(21) Appl. No.: 10/769,799

(22) Filed: Feb. 3, 2004

(65) Prior Publication Data

US 2004/0155615 A1    Aug. 12, 2004

(30) Foreign Application Priority Data

Feb. 7, 2003    (KR) .................... 10-2003-0007873

(51) Int. Cl.
*H02P 1/00*    (2006.01)
(52) U.S. Cl. .................... 318/377; 318/362; 318/370
(58) Field of Classification Search ........ 318/370–379, 318/439, 434, 139, 146, 138, 254; 363/132; 307/45, 46; 290/31, 52; 187/290, 288; 429/9
See application file for complete search history.

(56) References Cited

U.S. PATENT DOCUMENTS

| | | | | |
|---|---|---|---|---|
| 5,373,195 | A | * | 12/1994 | De Doncker et al. .......... 307/45 |
| 5,710,699 | A | * | 1/1998 | King et al. .................. 363/132 |
| 6,093,975 | A | * | 7/2000 | Peticolas ..................... 290/52 |
| 6,177,734 | B1 | * | 1/2001 | Masberg et al. ............... 290/31 |
| 6,281,646 | B1 | * | 8/2001 | Masberg et al. ............. 318/139 |
| 6,311,801 | B1 | * | 11/2001 | Takagi et al. ................ 187/290 |
| 6,331,365 | B1 | * | 12/2001 | King ........................... 429/9 |
| 6,498,448 | B2 | * | 12/2002 | Shimogama ................ 318/362 |
| 6,607,251 | B2 | * | 8/2003 | Baumgartner et al. ........ 303/20 |
| 6,630,805 | B2 | * | 10/2003 | Makaran ..................... 318/254 |
| 6,853,159 | B2 | * | 2/2005 | Kolomeitsev et al. ....... 318/434 |
| 6,879,123 | B2 | * | 4/2005 | Youm ......................... 318/370 |
| 7,026,783 | B2 | * | 4/2006 | Eckardt ...................... 318/800 |
| 2001/0000293 | A1 | * | 4/2001 | Makaran ..................... 318/254 |

(Continued)

FOREIGN PATENT DOCUMENTS

JP    57-031008    2/1982

(Continued)

OTHER PUBLICATIONS

Office action issued by the Korean Patent Office on Jan. 7, 2005.

(Continued)

*Primary Examiner*—Paul Ip
(74) *Attorney, Agent, or Firm*—Staas & Halsey LLP

(57) ABSTRACT

A motor control apparatus supplying braking power to brake a motor comprises a braking power providing unit to receive input power having an input power voltage lower than a braking power voltage and to boost the input power voltage up to the braking power voltage to brake the motor; a switching unit closing to allow the braking power providing unit to store the input power and opening to allow the braking power providing unit to output the braking power by boosting the input power voltage and a stored power voltage up to the braking power voltage; and a controller to control the switching unit to close and to open. With this configuration, a motor control apparatus is provided, in which an additional braking power supply supplying braking power to brake a motor is not needed, thereby decreasing a production cost and a size of a product.

16 Claims, 5 Drawing Sheets

U.S. PATENT DOCUMENTS

| | | | |
|---|---|---|---|
| 2005/0007048 A1* | 1/2005 | Youm | 318/372 |
| 2005/0098397 A1* | 5/2005 | Nakamura | 188/158 |

FOREIGN PATENT DOCUMENTS

| | | |
|---|---|---|
| JP | 57-95091 | 6/1982 |
| JP | 6-315287 | 11/1994 |
| JP | 6-315288 | 11/1994 |
| JP | 2002-291269 | 10/2002 |
| KR | 1995-0022017 | 7/1995 |
| KR | 10-312895 | 3/2001 |
| KR | 10-365921 | 1/2002 |
| KR | 2002-0016421 | 3/2002 |

OTHER PUBLICATIONS

Office Action for corresponding Japanese Application No. 2003-383080 mailed Sep. 13, 2005.

* cited by examiner

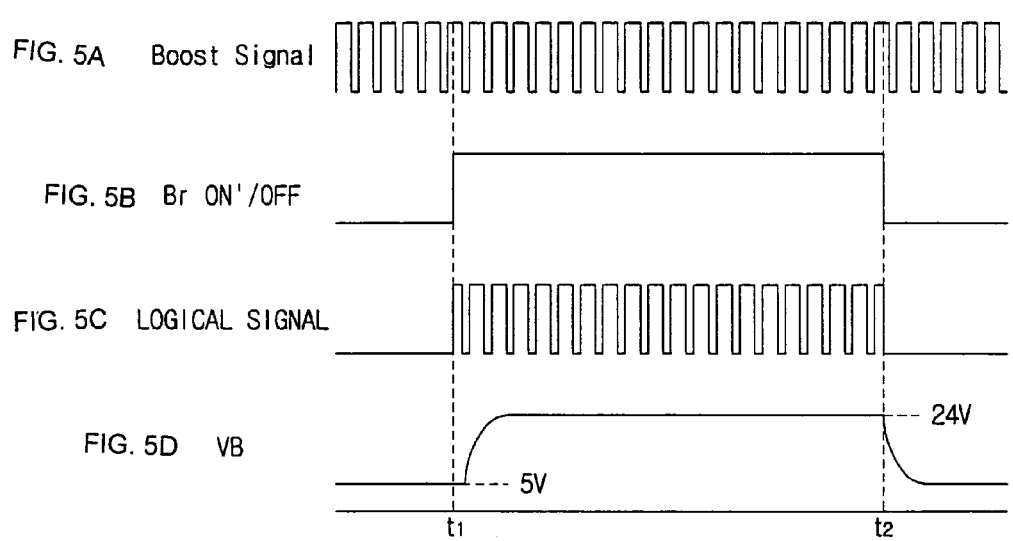

MOTOR CONTROL APPARATUS

CROSS-REFERENCE TO RELATED APPLICATION

This application claims the benefit of Korean Patent Application No. 2003-7873, filed Feb. 7, 2003, in the Korean Intellectual Property Office, the disclosure of which is incorporated herein by reference.

BACKGROUND OF THE INVENTION

1. Field of the Invention

The present invention relates to a motor control apparatus, and more particularly, to a motor control apparatus in which a power supply to drive other components is employed in braking a motor without an additional power supply.

2. Description of the Related Art

A three-phase motor has three windings and is driven by three-phase power. To control the three-phase motor, a motor control apparatus, as shown in FIG. 1, comprises a controller power supply 160 to supply power to an inverter controller 122 and a braking controller 124, an inverter 110 to supply the three-phase power to a motor 100, an inverter controller 122 to control the inverter 110 to generate the three-phase power, a braking circuit part 130 to brake the three-phase motor 100, and a braking controller 124 to output a braking signal to brake the three-phase motor 100 to the braking circuit part 130.

The inverter 110 converts DC (direct current) power into three-phase AC (alternating current) power and supplies the three-phase AC power to the three-phase motor 100, wherein the DC power is supplied through a rectifying part (not shown) and a capacitor (not shown) which rectify and smooth commercial AC power of an AC power supply (not shown). Here, the inverter 110 comprises a plurality of transistors 120 and a plurality of diodes 140.

The inverter controller 122 operates at a voltage of 5V and selectively turns on/off the transistors 120 of the inverter 110, thereby controlling the inverter 110 to convert the DC power into the three-phase AC power.

The braking circuit part 130 includes a relay part 132 closing and opening so as to control a supply of braking power from a braking power supply 170 to the three-phase motor 100, and a braking condenser 134 to store the braking power supplied from the braking power supply 170. Further, the braking power supplied from the braking power supply 170 via the braking condenser 134 generally has a voltage of 24V. The relay part 132 is closed/opened by a relay driving circuit 132a according to control by the braking controller 124.

Further, the braking circuit part 130 comprises a braking diode 136 to prevent a voltage spike generated a moment when the relay part 132 is opened from being supplied to the braking power supply 170, and a freewheeling diode 137 to bypass a current remaining in the three-phase motor 100 when the three-phase motor 100 is disconnected from the braking circuit part 130 by, for example, a disconnection of a connector 138.

However, in the conventional motor control apparatus, the power supplied to the inverter controller 122 and the braking controller 124 is different from that supplied to the braking circuit part 130 in a voltage thereof, so that the braking power supply 170 is further provided to generate the braking power to brake the three-phase motor 100. Therefore, a production cost and a size of a product are increased for the conventional motor control apparatus.

SUMMARY OF THE INVENTION

Accordingly, it is an aspect of the present invention to provide a motor control apparatus to generate braking power without an additional power supply.

Additional aspects and/or advantages of the invention will be set forth in part in the description which follows and, in part, will be obvious form the description, or may be learned by practice of the invention.

The above and/or other aspects are achieved by providing a motor control apparatus supplying braking power to brake a motor, comprising a braking power providing unit to receive input power having an input power voltage lower than a braking power voltage and to boost the input power voltage up to the braking power voltage to brake the motor; a switching unit being closed to allow the braking power providing unit to store the input power and being opened to allow the braking power providing unit to output the braking power by boosting the input power voltage and a stored power voltage up to the braking power voltage; and a controller to control the switching unit to selectively close and open.

The motor control apparatus may further comprise a controller power supply to supply driving power to the controller, wherein the driving power from the controller power supply is used as the input power to be supplied to the braking power providing unit.

The braking power providing unit may comprise an inductor to store the input power supplied from the controller power supply; and a condenser to output the input power and a stored power of the inductor as the braking power, when the switching unit is opened.

The switching unit may be connected to opposite ends of the condenser.

The switching unit may be an FET having a gate terminal connected to the controller, and drain and source terminals respectively connected to the opposite ends of the condenser.

The motor control apparatus may further comprise a diode having an anode connected to the inductor and a cathode connected to the condenser, and preventing a voltage spike generated a moment when the condenser is disconnected from the motor from being supplied to the inductor.

The controller may output a boost signal having a predetermined duty cycle and a braking signal to brake the motor; and the motor control apparatus may further comprise an AND circuit part performing an AND operation between the boost signal and the braking signal which are outputted from the controller, and outputting a logical value to the gate terminal of the FET.

BRIEF DESCRIPTION OF THE DRAWINGS

These and/or other aspects and advantages of the present invention will become apparent and more readily appreciated from the following description of the embodiments, taken in conjunction with the accompany drawings of which:

FIGS. 5A–5D illustrate four waveforms of a boost signal, a braking signal, a logic signal from an AND circuit, and a braking voltage in the motor control apparatus according to the embodiment of the present invention.

DETAILED DESCRIPTION OF THE PREFERRED EMBODIMENT

Figure 1:
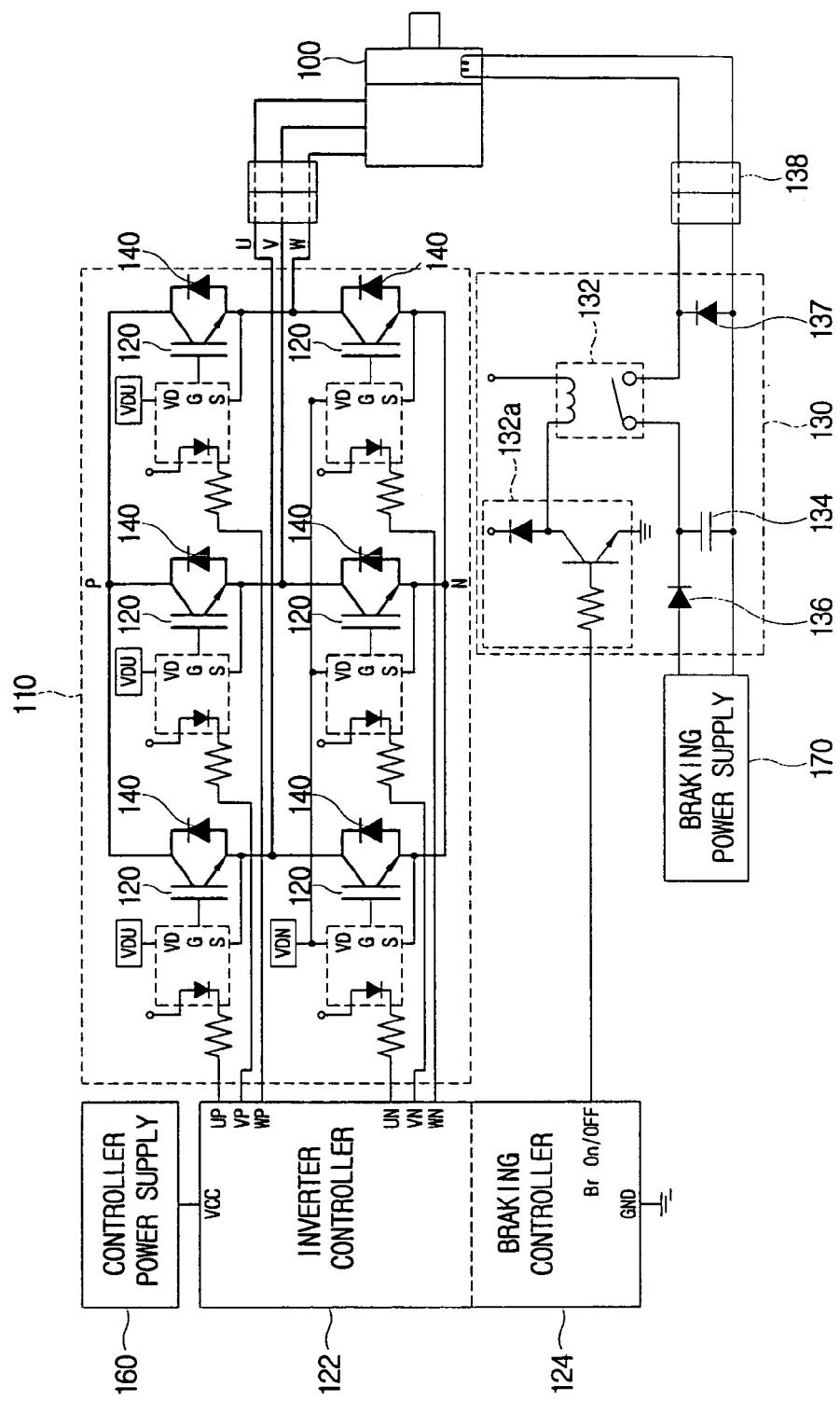
FIG. 1 is a circuit diagram of a conventional motor control apparatus.

Reference will now be made in detail to the embodiment of the present invention, examples of which are illustrated in the accompanying drawings, wherein like reference numerals refer to like elements throughout. The embodiment is described below in order to explain the present invention by referring to the figures.

Figure 2:
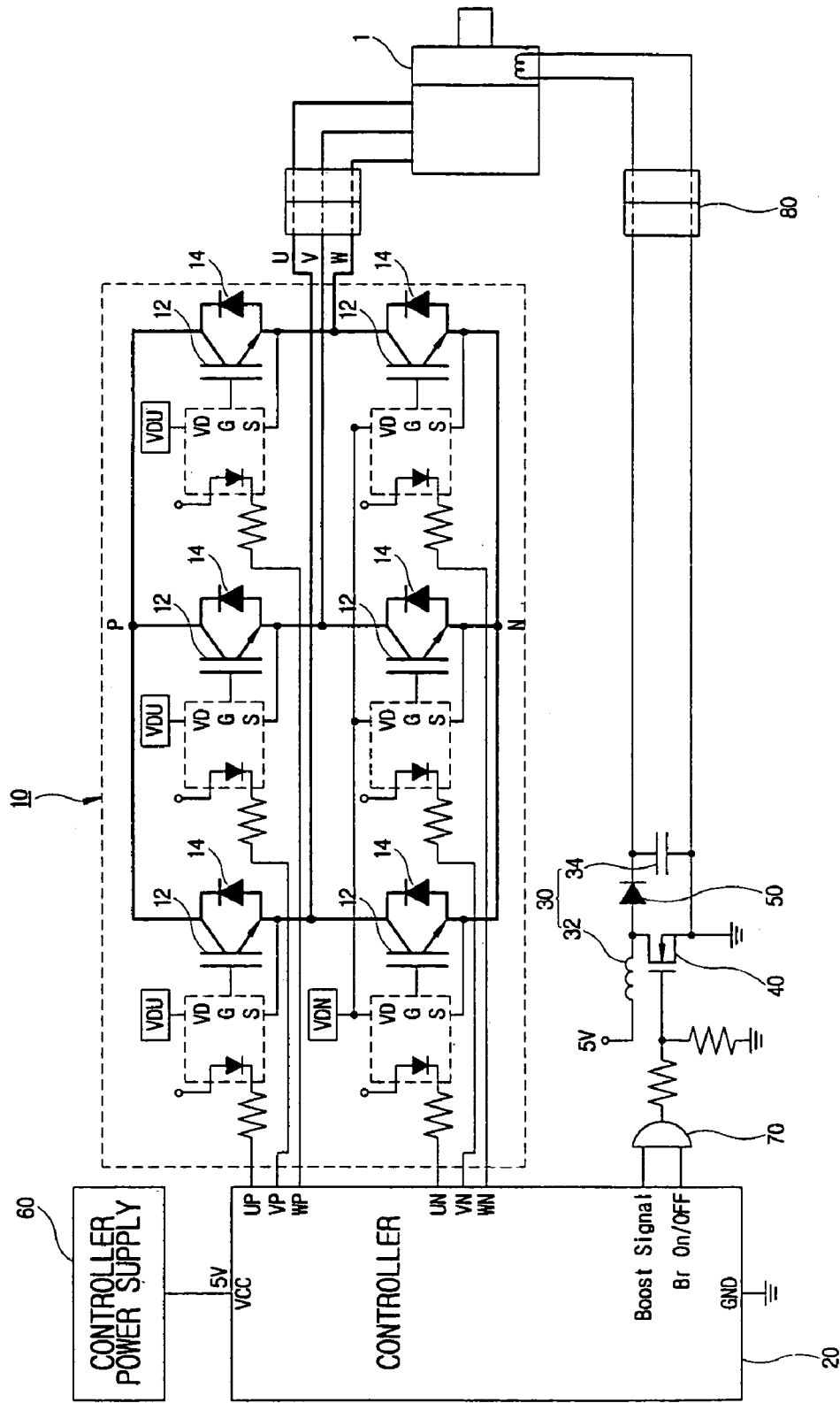
FIG. 2 is a circuit diagram of a motor control apparatus according to an embodiment of the present invention.

FIG. 2 is a circuit diagram of a motor control apparatus according to an embodiment of the present invention.

Referring to FIG. 2, a motor control apparatus comprises a braking power providing unit 30 to receive input power having an input power voltage lower than a braking power voltage and to boost the input power voltage up to the braking power voltage to brake a motor 1; a switching unit 40 closing to allow the braking power providing unit 30 to store the input power and opening to allow the braking power providing unit 30 to output braking power by boosting the input power voltage and a stored power voltage up to the braking power voltage; and a controller 20 to control the switching unit 40 to close and to open. Further, the motor control apparatus comprises an inverter 10 to generate multi-phase AC power to drive the motor 1.

To the inverter 10 is supplied DC power through a rectifying part (not shown) and a capacitor (not shown) which rectify and smooth commercial AC power of an AC power supply (not shown). The inverter 10 receives the DC power through the rectifying part and the capacitor and converts the DC power into the multi-phase AC power having various frequencies, thereby supplying the three-phase AC power to the motor 1. The motor 1 is driven to rotate by the multi-phase AC power supplied from the inverter 10. Further, the inverter 10 comprises a plurality of transistors 12 and a plurality of diodes 14, and the controller 20 selectively turns on/off the transistors 12 of the inverter 10 so as to control the inverter 10 to convert the DC power into the three-phase AC power having the various frequencies.

Further, the motor control apparatus comprises a controller power supply 60 to supply driving power to the controller 20. Further, a driving power voltage to drive the controller 20 is lower than the braking power voltage to brake the motor 1, and the driving power from the controller power supply 60 is used as the input power to supply the braking power providing unit 30.

The braking power providing unit 30 comprises an inductor 32 to store the input power supplied from the controller power supply 60, and a condenser 34 to smooth the input power and the stored power of the inductor 32 when the switching unit 40 is open and outputting the braking power.

The switching unit 40 is connected to opposite ends of the condenser 34. An FET (field effect transistor) is, as shown in FIG. 2, such that the gate terminal of the FET 40 is connected to the controller 20, and a drain terminal of the FET 40 and a source terminal of the FET 40 are, respectively, connected to the opposite ends of the condenser 34. The drain and source of the FET 40 are connected to each other or are disconnected from each other according to a control signal, which is outputted from the controller 20 to the gate terminal of the FET 40.

Further, the motor control apparatus comprises an AND circuit part 70 provided between the controller 20 and the gate terminal of the FET 40 and performing an AND operation between a boost signal and a braking signal ("Br on/off") which are outputted from the controller 20, thereby outputting a logical value to the gate terminal of the FET 40. Further, an AND gate may be used as the AND circuit part 70, which outputs a logical signal having a first level of "1" only when both the boost signal and the braking signal have logical values of "1", and, otherwise, outputs the logical signal having a second level of "0". The FET 40 may turn off when the AND circuit part 70 outputs the logical signal having the first level of "1", and may turn on when the AND circuit part 70 outputs the logical signal having the second level of "0".

With this configuration of the motor control apparatus, a process of outputting the braking power to brake the motor 1 will be described with reference to FIGS. 2 through 5D.

The controller 20 controls the transistors 12 of the inverter 10 to selectively turn on/off to supply the three-phase AC power to the motor 1. Further, the controller 20 operates by a voltage of 5V supplied from the controller power supply 60.

Further, the controller 20 continuously outputs the boost signal having a predetermined duty cycle to the AND circuit part 70. Simultaneously, the controller 20 outputs the braking signal having a logical value of "0" to the AND circuit part 70. The AND circuit part 70 performs the AND operation between the boost signal and the braking signal, which has the logical value of "0" and outputs the logical signal having the second level of "0" to the gate terminal of the FET 40 to connect the drain terminal of the FET 40 and the source terminal of the FET 40, i.e., turning on the FET 40.

Figure 3:
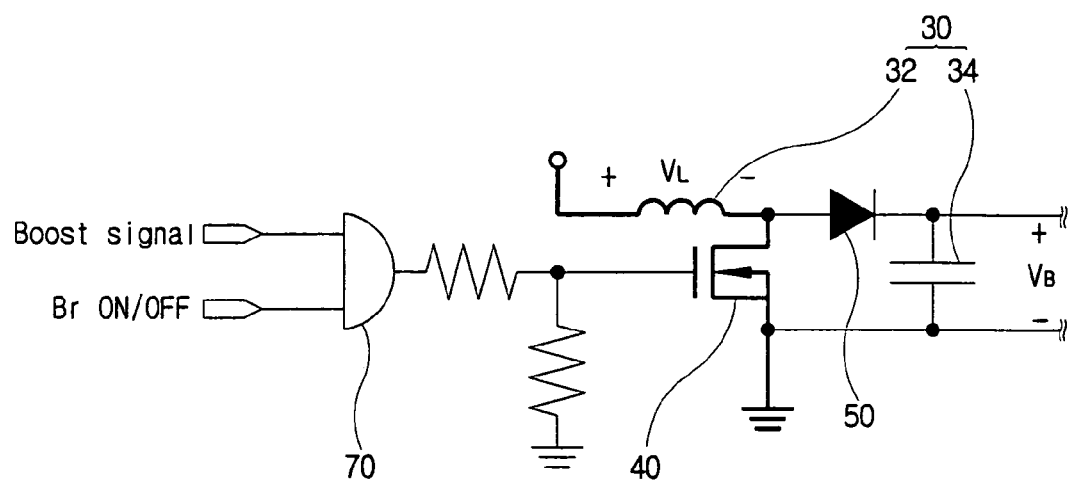
FIG. 3 is a schematic diagram illustrating a state in which a switching unit of the motor control apparatus according to the embodiment of the present invention is closed.

FIG. 3 illustrates power flow on the braking power providing unit 30 when the FET 40 is turned on. In this case, the input power having the voltage of 5V is stored in the inductor 32 while the FET 40 is turned on. Further, voltage "$V_L$" applied between opposite ends of the inductor 32 can be written as follows, where inductance of the inductor 32 is "L".

$$V_L = L\frac{di}{dt}$$

However, when the controller 20 senses a predetermined signal to brake the motor 1 (refer to "$t_1$" in FIG. 5D), the controller 20 outputs the braking signal having the logical value of "1" and the braking signal having the logical value of "1" is transmitted to the AND circuit part 70, and the AND circuit part 70 performs the AND operation between the boost signal and the braking signal having the logical value of "1", to output the logical signal. Further, the logical signal outputted from the AND circuit part 70 has a waveform corresponding to a waveform of the boost signal, and turns on/off the FET 40 in response to a duty cycle of the braking signal.

Figure 4:
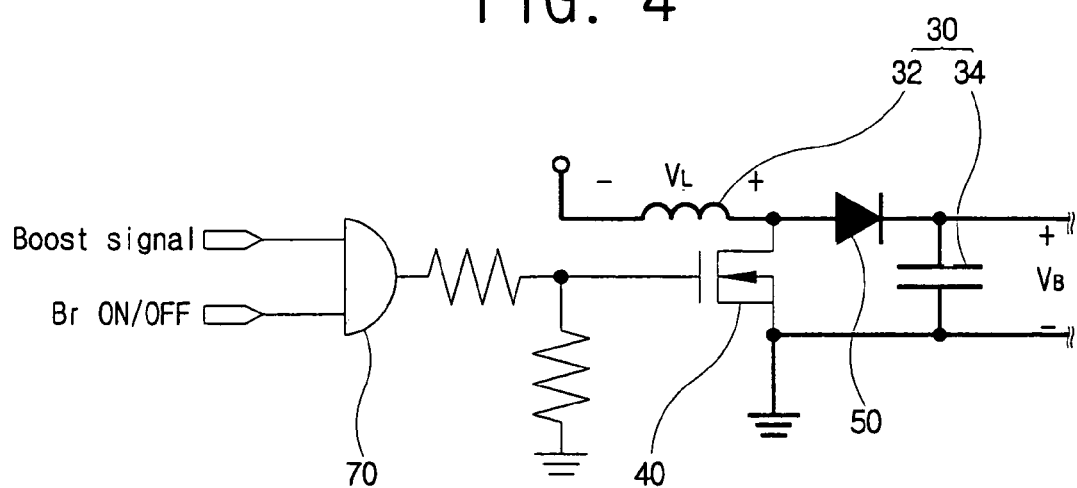
FIG. 4 is a schematic diagram illustrating a state in which the switching unit of the motor control apparatus according to the embodiment of the present invention is opened.

FIG. 4 illustrates a power flow on the braking power providing unit 30 when the FET 40 is turned off. In this case, the input power from the controller power supply 60 and the power stored in the inductor 32 are stored in the condenser 34. The power stored in the condenser 34 is outputted and used as the braking power to brake the motor 1. Further, a voltage "$V_B$" outputted to the condenser 34 can be written as follows.

$$V_B = 5V - V_L$$

Where $V_L$ (refer to equation 1) is a voltage applied between the opposite ends of the inductor 32, whose positive and negative ends are reversed when the FET 40 is turned off, the $V_L$ having a negative value. Therefore, the voltage "$V_B$" outputted to the condenser 34 is higher than the input power of 5V applied to the inductor 32. That is, the braking power voltage outputted through the condenser 34 is higher than the input power voltage inputted to the inductor 32. FIG. 5D illustrates that the braking power "$V_B$" outputted through the condenser 34 is 24V.

Further, when the controller 20 does not sense a predetermined signal to brake the motor 1 or senses a predetermined signal to interrupt braking of the motor 1 (refer to "$t_2$" in FIG. 5D), the controller 20 outputs the braking signal having the logical value of "0". Then, the braking signal having the logical value of "0" is transmitted to the AND circuit part 70, and the AND circuit part 70 outputs the logical signal having the second level of "0", thereby turning on the FET 40 and allowing the inductor 32 to store the input power supplied from the controller power supply 60.

Further, the motor control apparatus comprises a spike diode 50 having an anode connected to the inductor 32 and a cathode connected to the condenser 34, and preventing a voltage spike generated a moment the condenser 34 is disconnected from the motor 1 from being supplied to the inductor 32. Thus, when the condenser 34 disconnects from the motor 1 according to a disconnection of a connector 80 or to a broken wire connecting the condenser 34 with the motor 1, the inductor 32 or the controller power supply 60 is prevented from being damaged by a reverse-current of the voltage spike.

The motor control apparatus may use the power supplied from the controller power supply 60 to the controller 20 in generating the braking power. However, power having a voltage lower than that of the braking power voltage used to drive other components may be used in generating the braking power.

The FET 40 may be used as the switching unit 40. However, a different kind of transistor, a relay, etc. may be used as the switching unit 40, which is connectable to the opposite ends of the condenser 40 and turns on/off according to the control signal of the controller 20.

The controller 20 may control both the inverter 10 and the switching unit 40. However, the inverter 10 and the switching unit 40 may be controlled by an inverter controller and a braking controller, respectively.

The motor control apparatus may be applied to the motor 1 having the three-phase configuration. However, the motor control apparatus may be applied to a single-phase motor.

As described above, the motor control apparatus comprises the braking power providing unit 30 to receive the input power having an input power voltage lower than the braking power voltage and to boost the input power voltage up to the braking power voltage to brake the motor 1; the switching unit 40 closing to allow the braking power providing unit 30 to store the input power and opening to allow the braking power providing unit 30 to output the braking power by boosting both the input power voltage and the stored power voltage up to the braking power voltage; and the controller 20 to control the switching unit 40 to close and to open. The conventional braking power supply is not required to supply braking power, thus, a production cost and a size of a product is decreasable.

As described above, a motor control apparatus is provided, in which an additional braking power supply supplying braking power to brake a motor is not needed, thereby decreasing the production cost and the size of the product.

Although an embodiment of the present invention has been shown and described, it will be appreciated by those skilled in the art that changes may be made in the embodiment without departing from the principles and spirit of the invention, the scope of which is defined in the appended claims and their equivalents.

What is claimed is:

1. A motor control apparatus supplying braking power for braking a motor, comprising:
    a braking power providing unit to receive an input voltage lower than a braking voltage and to boost the input voltage to the braking voltage to brake the motor;
    a switching unit closing to allow the braking power providing unit to store input power and opening to allow the braking power providing unit to output braking power by boosting the input voltage and a stored voltage to the braking voltage;
    a controller to control the switching unit to close and to open; and
    a power supply to supply power to the controller, wherein the power from the power supply is used as the input power to be supplied to the braking power providing unit.

2. The motor control apparatus according to claim 1, wherein the braking power providing unit comprises:
    an inductor to store the input power from the power supply, as a stored power; and
    a condenser to output the input power and the stored power of the inductor as the braking power, when the switching unit is opened.

3. The motor control apparatus according to claim 2, wherein the switching unit is connected to opposite ends of the condenser.

4. The motor control apparatus according to claim 2, wherein the switching unit is a field effect transistor having a gate terminal connected to the controller, and drain and source terminals, respectively, connected to opposite ends of the condenser.

5. The motor control apparatus according to claim 4, wherein:
    the controller outputs a boost signal having a predetermined duty cycle and a braking signal to brake the motor; and
    the motor control apparatus further comprises
        an AND circuit part performing an AND operation between the boost signal and the braking signal which are outputted from the controller, and outputting a logical value to the gate terminal of the field effect transistor.

6. The motor control apparatus according to claim 5, wherein the AND circuit part comprises:
    an AND gate, which outputs a logical signal having a first level only when both the boost signal and the braking signal have first logical values, and otherwise outputs the logical signal having a second level.

7. The motor control apparatus according to claim 6, wherein the field effect transistor is turned off when the AND gate outputs the logical signal having the first level and is turned on when the AND gate outputs the logical signal having the second level.

8. The motor control apparatus according to claim 4, wherein the drain and source terminals of the field effect transistor are selectively connected according to a control signal, which is outputted from the controller to the gate terminal of the field effect transistor.

9. The motor control apparatus according to claim 4, wherein the field effect transistor is turned on/off in response to a duty cycle of a braking signal.

10. The motor control apparatus according to claim 2, further comprising:
a diode having an anode connected to the inductor and a cathode connected to the condenser, and preventing a voltage spike, generated when the condenser is disconnected from the motor, from being supplied to the inductor.

11. The motor control apparatus according to claim 1, further comprising:
an inverter having transistors to selectively turn on/off to supply three-phase AC power to the motor, wherein the controller controls the inverter.

12. The motor control apparatus according to claim 1, wherein the controller operates by a voltage of 5 volts supplied from the power supply.

13. The motor control apparatus according to claim 1, wherein the switching unit comprises:
a transistor or a relay.

14. The motor control apparatus according to claim 1, further comprising:
an inverter having transistors to selectively turn on/off to supply three-phase AC power to the motor, wherein the controller comprises:
an inverter controller to control transistors of the inverter; and
a braking controller to control the switching unit.

15. A motor control apparatus supplying braking power to a braking power providing unit for braking a motor, comprising:
a controller to control the braking power providing unit to brake the motor and to store input power, as stored power, to supplement the power to the braking power providing unit when braking the motor; and
a power supply to supply power to the controller such that, when braking the motor, the input power from the power supply is supplemented by the stored power from the controller and supplied to the braking power providing unit.

16. A braking power providing unit receiving an input voltage lower than a braking voltage and boosting the input voltage to a braking voltage to brake a motor, comprising:
an inductor, storing power of the input voltage from a power supply; and
a condensor, outputting a voltage higher than the input voltage to the inductor to brake the motor,
wherein a switching unit closes to allow the braking power providing unit to store input power and opens to allow the braking power providing unit to output braking power by boosting the input voltage and the stored voltage to the braking voltage,
a controller to control the switching unit to close and to open; and
a power supply to supply power to the controller, wherein the power from the power supply is used as the input power to be supplied to the braking power providing unit.

* * * * *

UNITED STATES PATENT AND TRADEMARK OFFICE
CERTIFICATE OF CORRECTION

PATENT NO. : 7,170,246 B2
APPLICATION NO. : 10/769799
DATED : January 30, 2007
INVENTOR(S) : Jang-Hyoun Youm It is certified that error appears in the above-identified patent and that said Letters Patent is hereby corrected as shown below:

Column 8, Line 19, change "condensor," to --condenser--.

Signed and Sealed this

Twenty-fourth Day of April, 2007

JON W. DUDAS
*Director of the United States Patent and Trademark Office*